United States Patent [19]
Hartmann et al.

[11] Patent Number: 4,466,853
[45] Date of Patent: Aug. 21, 1984

[54] MACHINE FOR THE MANUFACTURE OF MOLDED BODIES

[75] Inventors: Werner Hartmann, Krefeld-Forstwald, Fed. Rep. of Germany; Eduard Küsters, Gustav-Fünders-Weg 18, 14150 Krefeld, Fed. Rep. of Germany

[73] Assignee: Eduard Küsters, Krefeld, Fed. Rep. of Germany

[21] Appl. No.: 247,055

[22] Filed: Mar. 24, 1981

[30] Foreign Application Priority Data

Apr. 23, 1980 [DE] Fed. Rep. of Germany ....... 3015518

[51] Int. Cl.[3] ............................................ B32B 31/14
[52] U.S. Cl. .................................. 156/381; 156/62.2; 156/242; 156/246; 156/500; 264/85; 264/109; 425/73; 425/75

[58] Field of Search ............... 156/242, 246, 381, 382, 156/62.2, 500; 264/85, 109; 425/73, 74, 75, 128, 210, 405 R, 445, 446

[56] References Cited

U.S. PATENT DOCUMENTS 1,953,704 4/1934 Erdmann .............................. 425/73
3,619,450 11/1971 Futo .................................. 264/109
4,111,744 9/1978 Reiniger .............................. 264/85

*Primary Examiner*—Caleb Weston
*Attorney, Agent, or Firm*—Kenyon & Kenyon

[57] ABSTRACT

In order to manufacture molded bodies by pressing finely divided material with a binder while the binder sets, such as to avoid problems caused because of contact of the binder or vapors therefrom with oxygen, the pressing and setting is carried out in a gas atmosphere different from air.

4 Claims, 4 Drawing Figures

MACHINE FOR THE MANUFACTURE OF MOLDED BODIES

BACKGROUND OF THE INVENTION

The invention relates to the manufacture of molded bodies by pressing finely divided material with a binder in general and more particularly to an improved method of this type for manufacturing molded bodies, as well as an appropriate machine for carrying out the method.

In the manufacture of molded bodies of the kind under discussion, especially in the manufacture of chip boards, organic binders, for instance, in the form of resins of the most varied kind, are usually used. In certain cases, particularly at elevated temperature, these resins present difficulties if they are in contact with the oxygen in the air. The resins can be subjected, for instance, to undesired oxidation which can go as far as the danger of explosion. This can also be brought about by the fact that the binders secrete vapors during the setting process which, together with the oxygen of the air, result in an explosive mixture.

SUMMARY OF THE INVENTION

Starting from this problem, it is an object of the present invention to develop a method of this nature in such a manner that separation of the material from the ambient atmosphere is provided during the pressing and setting.

According to the present invention, this problem is solved by carrying out the pressing and setting in a gas atmosphere different from air.

Obviously, the difficulties which resulted from the continuous access of air in the conventional method, are eliminated thereby. The invention, however, comprises not only the avoidance of possible detrimental effects of the presence of air but, in addition, also provides a possible positive effect of the gas atmosphere which is different from air, on the setting of the binder and the formation of the molded body. It is conceivable, for instance, that certain binding processes are catalyzed by the presence of a certain gas or that through the presence of such gas at the surface of the molded body being formed, setting processes deviating from the interior take place there in a desired manner.

In most cases, however, the binder and/or the material will be sensitive to oxygen at high temperatures, so that the method will be one in which the oxygen concentration in the gas atmosphere does not exceed, at most, a very low value.

A gas for the purpose under discussion, which is easy to handle particularly because its density is higher than that of air, is carbon dioxide. A less expensive alternative is nitrogen. It, however, is lighter than air and accordingly requires appropriate equipment. In some cases it is sufficient to replace the oxygen component of the air in the vicinity of the pressing zone, to a considerable part, with nitrogen, in order to obtain a sufficient reduction of the reactivity of the air.

If the requirements as to the purity of the gas atmosphere surrounding the pressing zone are less stringent, in some cases it is sufficient to surround the pressing zone by a stream of the gas, for instance, by providing gas outlet openings on one side of the pressing zone and suction openings for the gas on the opposite side and to make sure that the entire pressing zone is in the resulting flow.

Depending on the design of the press, the pressing zone may also be surrounded by a tray that can be filled with the gas.

The carbon dioxide embodiment is thought to be the safest embodiment. Furthermore, it can also be realized in practice relatively simply, however, provided that the entire press is arranged in a pit which can be filled with the gas and the upper edge of which extends at least to above the pressing zone.

In both above-mentioned cases a gas is used, of course, which is heavier than air and is able to displace air from the tray or the pit without escaping into the ambient atmosphere to an appreciable extent. Carbon dioxide meets these requirements.

The installation of a hood can be considered if the gas is lighter than air. Panels such as chip board can be produced continuously in the form of webs. In certain critical cases it may be necessary to install the continuous press, with its feeding and removal equipment entirely in the pit if the material must also be in the gas atmosphere in the charging section and the discharging section. As a result, the pit and the amount of gas to be fed in must, of course, be very large and other handling problems in the charging and discharging section occur also. Therefore, if it is only necessary to maintain the gas atmosphere in the pressing zone proper, the charging section and the discharging section can be also situated outside the pit or tray or hood and can be sealed from the gas atmosphere.

In many cases the seal need not be perfect, if the gas, as for instance, in the case of carbon dioxide, is not poisonous or explosive. Provision must merely be made that excessive amounts of gas are not lost from the pit through overflow at the points where the lower forming belt enters or leaves the pit.

DETAILED DESCRIPTION

Figure 1:
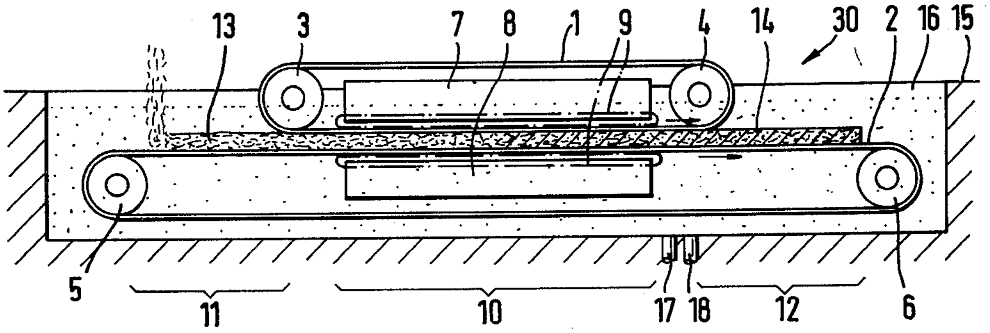
FIG. 1 shows a vertical longitudinal section through a press for the continuous manufacture of chip board, with two revolving forming belts, which is arranged in a pit.

The press 30 of FIG. 1 comprises an upper forming belt 1 and a lower forming belt 2 which revolves endlessly in the directions indicated around the cylinders 3 and 4 and 5 and 6. The cylinders 3 and 4 and 5 and 6 have horizontal axes parallel to each other. The cylinders 4 and 6 are driven.

Between the cylinders 3 and 4, above the lower section of the forming belt 1, a support structure 7 in the form of a heavy plate is arranged. Below the upper section of the forming belt 2 a support structure 8 is arranged opposite the support structure 7. The support structures 7 and 8 are connected to each other laterally outside the forming belts 1 and 2 by strong anchors. The forming belts 1 and 2 are braced, a rolling motion in their forward travel, against the sides of the support structures 7 and 8 facing each other, by roller chains 9. The roller chains 9 return in suitable slots in the support structure 7 and 8. The pressing zone proper, 10, is formed between the suport structures 7 and 8.

The lower forming belt 2 is longer than the upper forming belt 1 and forms, ahead of the pressing zone 10, as seen in the travel direction, a charging section 11, in which a bed of material, from which the panel is to be formed, is placed on the lower forming belt 2. After the pressing zone 10, as seen in the travel direction, a discharge section 12 is provided, in which the finished panel 14 is taken from the lower forming belt 2.

The bed 13 placed on the lower forming belt 2 is taken along by the lower forming belt 2 in its forward travel and is compressed between this belt and the forming belt 1 in the pressing zone 10. The pressure and, if applicable, the heat, required for setting are transferred via the roller chains 9 and the forming belts 1 and 2 from the support structure 7 and 8 to the bed 13, whereby the compacted sheet web 14 is formed.

The entire press 30 is located in a pit 16 situated below the floor 15 of the room which has a feed line 17 for feeding a gas (indicated by dots), for instance, carbon dioxide, as well as a suction line 18 by means of which the gas can be drawn from the pit 16 if desired, for instance, if maintenance work is to be undertaken.

The upper edge of the pit, i.e., the level of the floor 15, is above the lower section of the forming belt 1, so that the material of the bed 13 is situated below the gas level when the pit 16 is filled with gas, and is separated from the ambient air atmosphere.

Arranging the press 30 in the pit 16 has advantages because the gas cannot spread in the factory room. However, the cost for this arrangement is relatively high.

Figure 2:
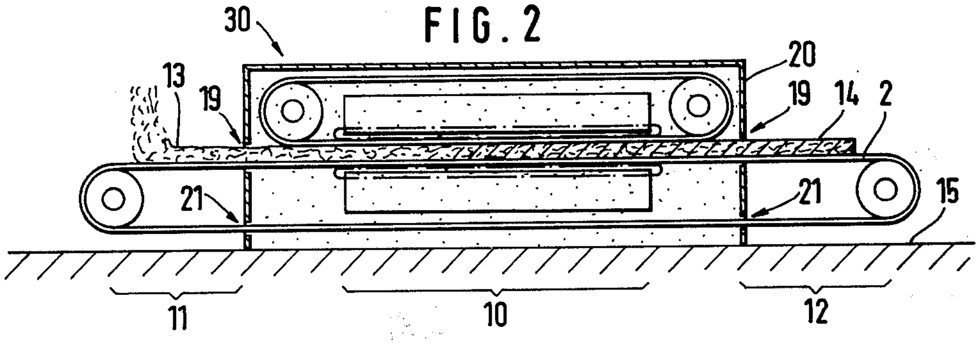
FIG. 2 shows a corresponding view in which the pressing zone is arranged in a tray and the chasrging and discharging section of the lower forming belt are arranged outside the tray.

In FIG. 2, another embodiment is shown, in which the press 30 is arranged in a tray 20 which sits on the floor 15 of the room. In the embodiment according to FIG. 2 the entire press is furthermore not arranged in the tray 20; only the region of the pressing zone 10 is in the tray while the charging region 11 and the discharging region 12 are located outside the tray 20. At the points 19 and 21 where the lower forming belt 2 passes through the walls of the tray 20, seals are provided; the upper seal 19, especially on the entrance side, cannot be a hermetic seal since it has to pass the loose bed 13.

Figure 3:
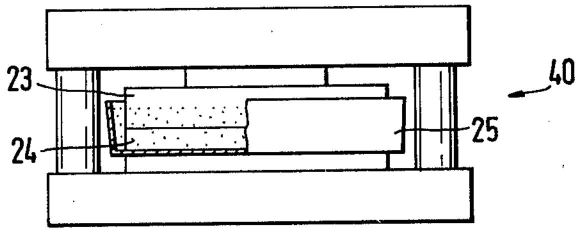
FIG. 3 shows a side view of a molding press in which the pressing zone proper is arranged in a tray.

In FIG. 3, an ordinary, not continuous, molding press 40 with two mold halves 23 and 24 which are pressed together is shown. In the region of the pressing zone between the two mold halves 23 and 24, a tray 25 is provided, by means of which a gas atmosphere can be maintained in the vicinity of the pressing zone when the tray is supplied with gas.

Also in the embodiments of FIGS. 2 and 3, suitable devices for filling and emptying the trays 20 and 25 with the gas are provided, of course.

Figure 4:
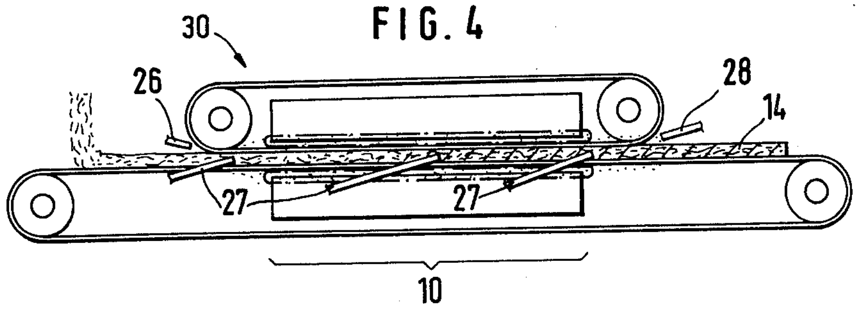
FIG. 4 shows a view corresponding to FIGS. 1 and 2 of an embodiment with a gas stream enclosing the pressing zone.

In FIG. 4, the press 30 is shown again. This time, however, no part is located in a container with a stationary amount of gas as in the other embodiments. Instead, the pressing zone 10 is surrounded by an enclosing gas stream. The gas is fed in through nozzles 26 at the press entrance and through other nozzles 27 along the sides of the press between the forming belts 1 and 2 and is optionally collected again on the exit side by means of a suction nozzle 28. While the gas in this embodiment does not bring about an absolute separation from the air atmosphere, it can still have an adequate effect as a protective gas if the requirements are less stringent. Covers or channels, not shown, may be provided along the edges of the web which hold the gas stream together.

Instead of a tray open at the top as in FIGS. 2 and 3, a hood which is closed at the top may also be provided if the gas is lighter than air and has a tendency to escape upward.

What is claimed is:

1. In a machine for the manufacture of molded bodies, in which finely divided material, mixed with a binder, is pressed, in a pressing zone, to achieve cohesion for forming the molded body while the binder sets, the improvement comprising a hood, having a closed top and sides and open on the bottom, for containing a gas which is at least largely low in oxygen and lighter than air, with at least the pressing zone of the machine enclosed by said hood and the gas therein.

2. In a machine for the manufacture of molded bodies, in which finely divided material, mixed with a binder, is pressed, in a pressing zone, to achieve cohesion for forming the molded body where the binder sets, the improvement comprising a tray which can be filled with gas, having a closed bottom and sides and an open top, for containing a gas which is at least largely low in oxygen and is heavier than air, with at least the pressing zone of the machine disposed within the gas within said tray.

3. In a machine for the manufacture of molded bodies, in which finely divided material, mixed with a binder, is pressed, in a pressing zone, to achieve cohesion for forming the molded body while the binder sets, the improvement comprising a pit, in which said machine is disposed, which can be filled with gas, the upper edge of which extends vertically at least beyond the pressing zone, having a closed bottom and sides and an open top, for containing a gas which is at least largely low in oxygen and is heavier than air, with at least the pressing zone of the machine disposed within the gas within said pit.

4. The improvement according to claim 2 or 3 for the continuous manufacture of boards in the form of a web and said machine being one in which the web is conducted in the pressing zone horizontally between endless forming belts which revolve according to the forward travel of the web and extend over the width of the web and, in the pressing zone, the pressure and, if applicable, the heat is transferred from a support structure arranged below the lower forming belt and a support structure arranged above the upper forming belt to the forming belts and the web and said machine includes a device for putting the layer of the material to be pressed on a charging section located ahead of the pressing zone as seen in the travel direction, and a device for removing the finished web from a discharging section situated behind the pressing zone as seen in the travel direction, the improvement further comprising the charging section and the discharging section being situated outside said gas containing means; and means for sealing said charging and discharging sections from said gas containing means.

* * * * *